Patented June 2, 1925.

1,540,391

UNITED STATES PATENT OFFICE.

SOMA GELLÉRI, DECEASED, BY FELICE GELLÉRI, ADMINISTRATRIX, OF BUDAPEST, HUNGARY, AND ANTON HAMBLOCH, OF ANDERNACH, GERMANY.

PREPARATION OF MAGNESIUM CARBONATES.

No Drawing. Application filed July 7, 1921. Serial No. 483,054.

*To all whom it may concern:*

Be it known that we, FELICE GELLÉRI and ANTON HAMBLOCH, citizens of Hungary and Germany, respectively, residing at Budapest, Hungary, and Andernach, Germany, respectively, FELICE GELLÉRI being administratrix to the estate of SOMA GELLÉRI, deceased, who invented jointly with ANTON HAMBLOCH, certain new and useful Improvements in the Preparation of Magnesium Carbonates, of which the following is a specification.

This invention comprises a process for the preparation of carbonate of magnesia from minerals, containing calcium and magnesium, as for instance, magnesite, dolomite or magnesium-silicates and the like.

This process is distinguished from the prior known processes, especially by the feature that the magnesium content of the minerals to be treated is obtained or recovered together with the alkali carbonate employed in the carrying out of the process from the reaction mixture in the form of a salt soluble at the temperature employed, whilst the calcium content of the mixture remains behind insoluble in the solid residue at the same temperature.

The invention therefore may be described as a special method of separation, by means of which the magnesium can be entirely separated from the calcium.

A process is already known, whereby the magnesium is separated from the calcium of dolomite, as bicarbonate of magnesium. This prior process is based upon the fact that the calcium and the magnesium are soluble in water containing carbonic acid in different degree, but it possesses various drawbacks as follows:

(1) Carbonate of magnesium and carbonate of calcium are certainly soluble in water containing carbonic acid in different degrees. This distinguishing solubility can however not be employed as a quantity of magnesium is dissolved out of the raw material.

All these drawbacks can be overcome by the application of the process forming the subject of the present application working with a solution of alkali metal bi-carbonate saturated with carbonic acid.

The process is carried out as follows: Either the mineral itself containing the magnesium in the form of carbonate or the product thereof obtained by roasting are respectively finely ground and then mixed with alkali metal carbonates or alkali metal bi-carbonates, dissolved in water, saturated with carbon dioxide, with or without pressure and heated to a temperature of from 60 to 70° cent. By this means the magnesium carbonate forms in the water containing carbonic acid, soluble carbonic acid double salts in combination with the alkali metal carbonate or bi-carbonate whilst the calcium content of the mineral remains behind in the form of insoluble calcium carbonate. The solution containing the carbonic acid double salts is then decanted from the insoluble residue containing the calcium carbonate as well as the iron salts of the mineral and the silica and alumina separated by the carbonic acid, and is then heated for a prolonged period, to a temperature of 100° cent., whereby the carbonic acid double salt is broken up into soluble alkali metal carbonate and insoluble magnesium carbonate which precipitates from the solution. The alkali metal carbonate which remains in solution can be employed for the treatment of further quantities of mineral containing calcium and magnesium as well as the carbonic acid, if arrangements are made for the recovery thereof.

The cause of the chemical decomposition occurring in this process can be explained as follows:

Whereas calcium-bicarbonate decomposes at a temperature of from 60 to 70° cent. and precipitates as insoluble mono-calcic carbonate, magnesium-alkali metal carbonate is still soluble at this temperature. Further, the excess of sodium bi-carbonate contained in the solution decomposes at this temperature into a sodium carbonate and carbonic acid and the sodium carbonate thus formed reacts upon the calcium carbonate, so that mono-calcic carbonate and sodium bi-carbonate are produced, and the latter forms with the $MgCO_3$ in solution containing carbonic acid, a soluble double salt as follows:

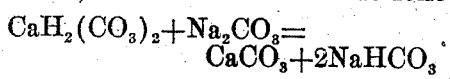
$$CaH_2(CO_3)_2 + Na_2CO_3 = CaCO_3 + 2NaHCO_3$$

and

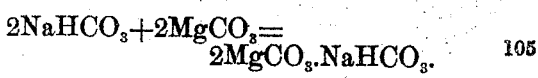
$$2NaHCO_3 + 2MgCO_3 = 2MgCO_3.NaHCO_3.$$

Furthermore, in this reaction $Na_2CO_3$ plays the part of a catalyzer, which very much assists the absorption and the reaction, that is to say, the transfer of the carbonic acid, whereby the formation of the magnesium solution and the extraction of the magnesium from the raw material is considerably quickened.

Finally, another advantageous action of the alkali metal carbonate is that the iron salts which would otherwise dissolve in the water containing carbonic acid together with the magnesium carbonate are precipitated by the use of alkali metal carbonate together with the calcium carbonate, and thus the obtaining of a chemically pure magnesium carbonate is rendered possible.

Having now particularly described and ascertained the nature of our said invention and in what manner the same is to be performed, we declare that what we claim is:

The herein described process for the production of magnesium carbonate from magnesium carbonates and magnesium silicates containing calcium, which consists in calcining the minerals containing calcium and magnesium carbonates, then finely grinding the same and mixing with alkali metal-carbonates, dissolving in water, saturated with carbon dioxide, and heating to from 60° to 70° centigrade, separating the solution containing the magnesium with the alkali metal as a double carbonic acid salt from the precipitated calcium carbonates and from the other solid residues, and subsequently decomposing by heat into insoluble magnesium carbonate and alkali metal carbonate remaining in solution.

In testimony whereof we hereunto affix our signatures.

FELICE GELLÉRI,
Administratrix of Soma Gelléri, deceased.
ANTON HAMBLOCH.